Figure 1:
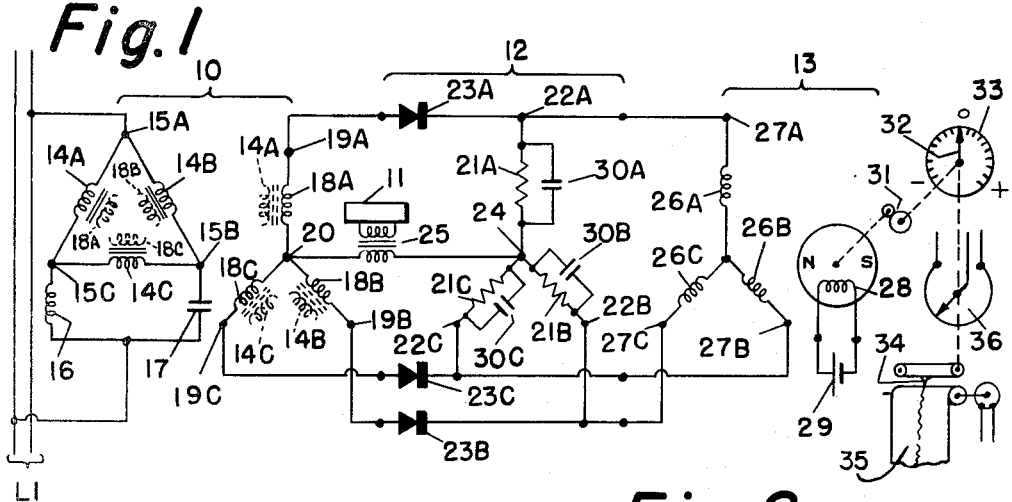

Feb. 15, 1966  D. B. GUNTHER  3,235,801
APPARATUS FOR MEASURING THE FREQUENCY VARIATIONS
OF A POWER-LINE SOURCE
Filed Oct. 9, 1961

United States Patent Office 3,235,801
Patented Feb. 15, 1966

3,235,801
APPARATUS FOR MEASURING THE FREQUENCY VARIATIONS OF A POWER-LINE SOURCE
David B. Gunther, Franconia Township, Montgomery County, Pa., assignor to Leeds and Northrup Company, Philadelphia, Pa., a corporation of Pennsylvania
Filed Oct. 9, 1961, Ser. No. 143,667
4 Claims. (Cl. 324—79)

This invention relates to arrangements for measuring the time-error of systems which generate and distribute electrical power.

In operation of such systems, the line-frequency, because of changes in load and generation, is sometimes above normal and other times below normal. Small deviations from normal of the instantaneous line-frequency may be tolerated, and in fact are utilized for predetermined sharing of load changes among generating sources. However, the station operator, the load dispatcher, or automatic control equipment performing their functions should be continuously informed of the integrated frequency-error of the system so that when it becomes desirable or necessary, appropriate steps may be taken to reduce or eliminate the difference between system time, as indicated by electric clocks, and real time.

In a commonly used previous arrangement for measuring system time-error, the Y winding of a synchronous motor was excited at line-frequency and a reference-frequency was applied to the single-phase winding of the motor. It was the purpose of such arrangement to produce rotation of the motor in a direction corresponding with and at a speed proportional to any existing difference between the line-frequency and the reference-frequency. With such arrangement, however, a high-speed rotating magnetic field exists in the motor at all times with the result that a sudden change in line voltage or frequency often imparted sufficient spin to the rotor to cause it to lock-in with such field and so rotate rapidly and out of control. Also with such arrangement, upon failure of the reference-frequency source, the single-phase winding acted as a shorted winding and the motor would rotate rapidly and out of control.

In accordance with the present invention, line-frequency and reference-frequency signals are combined externally of the motor, as in a polyphase rectifier circuit, to produce a polyphase difference-frequency signal which is applied to the polyphase winding of the motor to produce a relatively rotatable magnetic field whose speed is proportional to the difference between line and reference frequencies and whose direction of rotation is in one sense or the other depending upon whether the line-frequency is above or below the reference-frequency. The single-phase winding of the motor is energized by direct current, or alternatively, the motor element usually associated with such winding is equivalently magnetically polarized by use of permanent magnet structure. In either case, the lock-in between the two magnetic fields results in the rotor turning in a direction corresponding with the sense of the deviation of line-frequency from normal and at a speed proportional to such deviation. With such arrangement, the motor cannot go into uncontrolled rotation in event of line-transients or of failure of the reference-frequency source: specifically, in event of a sudden change in line-frequency or voltage, the rotor can rotate only at a speed proportional to any existing difference between the line and reference-frequencies: and in event of failure of the reference-frequency signal, thre is no rotating field to cause turning of the rotor.

More particularly, in accordance with the present invention, either the source of line-frequency signals or the source of reference-frequency signals is a polyphase source and the other is a single-phase source. Usually a suitable polyphase source of line-frequency is available, but if not, phase-splitting networks may be used to obtain the required number of phases for excitation of the motor. Specifically, when the motor has a three-phase winding, the source of reference-frequency may be a single-phase source and a phase-splitting network may be used to produce three-phase line-frequency signals from a single-phase power line. The single-phase reference-frequency signals and the three-phase line-frequency signals are combined in a network using rectifiers to produce three D.C. signals having superimposed thereon a three-phase difference-frequency signal for excitation of the three-phase winding of the motor. Any higher frequency component of the excitation signals are suppressed to insure that only a difference-frequency field exists. In absence of a line-frequency deviation, only the three D.C. signal components are present and they are effective to hold the rotor in the position of the arrested rotatable field.

The invention further resides in arrangements having the features of novelty and utility hereinafter described and claimed.

Figure 2:
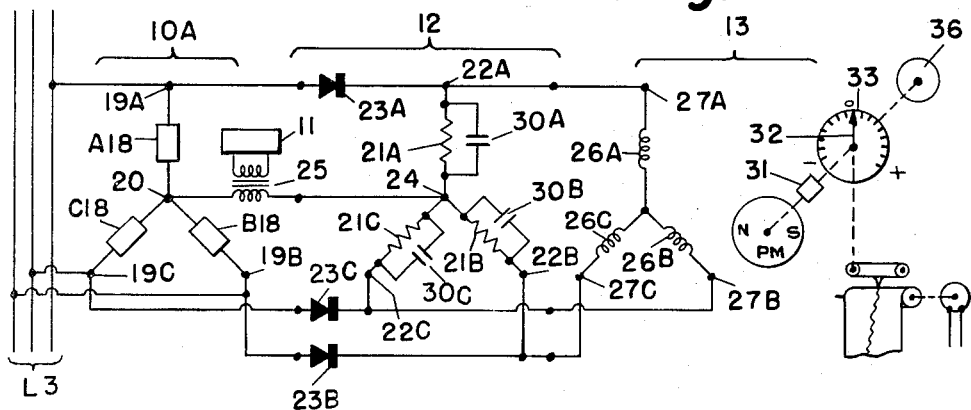
Figure 3:
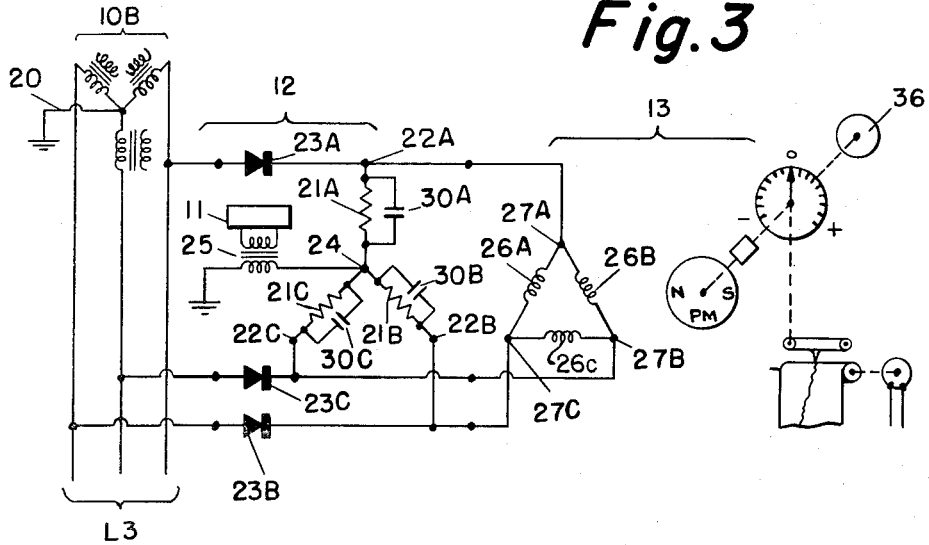

For a more detailed understanding of the invention, reference is made to the following description of various embodiments thereof and to the attached drawings in which:

FIG. 1 schematically illustrates an arrangement for measuring the time-error of the frequency appearing on a single-phase line;

FIG. 2 schematically illustrates an arrangement for measuring the time-error of the frequency appearing on a three-phase line; and FIG. 3 schematically illustrates an arrangement for measuring the time-error of the frequency appearing on a three-phase line having a grounded neutral.

The arrangement shown in FIG. 1 for measurement of the time-error or integrated frequency-error of the frequency appearing on the single-phase line L1 comprises a phase-splitting network 10, a source of reference-frequency 11, a difference-frequency generator 12 and a motor 13.

The phase-splitting network 10 comprises three transformers whose primary windings 14A, 14B, 14C are delta connected with one of the delta terminals 15A connected to one of the line conductors. The other two delta terminals 15B, 15C are connected to the other line conductor through the inductive and capacitive reactances 16, 17 respectively. The secondary windings 18A, 18B, 18C of the transformers are Y-connected. The three voltages respectively appearing between the leg terminals 19A, 19B, 19C of the Y and the neutral terminal 20 are of the line-frequency and are 120° out of phase with respect to one another. The difference-frequency generator 12 comprises three Y-connected resistors 21A, 21B, 21C. The leg terminals 22A, 22B, 22C of the Y are respectively connected to the leg terminals 19A, 19B, 19C of the phase-splitter 10 through the rectifiers 23A, 23B, 23C. The connection between the neutral terminal 24 of the Y network 21A, 21B, 21C and the neutral terminal 20 of the Y network 18A, 18B, 18C includes a suitable means, exemplified by transformer 25, for coupling to the source 11 of standard or reference frequency. The source 11 is rigidly stabilized and its output frequency is equal to the desired average of the line-frequency.

The three pulsating signal voltages respectively appearing between the terminals 22A, 22B, 22C and the neutral terminal 24 include sinusoidal components which are 120° out of phase and their frequency is equal to any existing difference between the superimposed line-frequency and the reference-frequency. Higher frequency components including the line-frequency, the reference-frequency and the frequency component corresponding with the sum of the line-frequency and the reference-frequency are effectively suppressed by the capacitors 30A, 30B, 30C respectively in shunt to the resistors 21A, 21B, 21C. In the arrangement shown, each of the three signal voltages is formed by a train of unidirectional pulses of the same polarity.

The stator element of motor 13 shown in FIG. 1 is provided with three Y-connected windings 26A, 26B, 26C. The leg terminals 27A, 27B, 27C of the windings are respectively connected to output terminals 22A, 22C, 22B of the difference-frequency generator 12. The magnetic fields produced by the windings 26A, 26B, 26C, as excited by the output of the difference-frequency generator, may be represented by three vectors which are spaced at 120° from each other. When the line-frequency matches the reference-frequency, the vectors are of constant magnitude and the resultant field has no rotational component but is effective as later discussed to lock the rotor in stationary position. When the line-frequency differs from the reference-frequency, each of these vectors in turn becomes larger than the other two and the resultant magnetic field rotates with respect to the stator at a speed proportional to the difference between the line and reference-frequencies. Moreover, the direction of rotation of such field depends upon whether the line-frequency is above or below the reference-frequency. The rotor of motor 13 shown in FIG. 1 has the usual single-phase winding 28 which as here utilized is energized from a direct-current source, exemplified by battery 29, magnetically to polarize the rotor. The resultant magnetic field of the rotor may be represented by a vector of constant magnitude and having a fixed position with respect to the rotor axis.

Therefore, when the line-frequency is above or below the reference-frequency, the fixed field of the rotor locks-in with the difference-frequency rotating field of the stator so that the rotor turns at a speed proportional to the line-frequency deviation and in a direction corresponding with the sense of such deviation. With the two pole rotor shown, the rotor shaft makes one revolution for each cycle of the difference-frequency: for example, if the line frequency is 60.1 c.p.s. (cycles per second) and the reference-frequency is 60 c.p.s., the rotor turns at the speed of 0.1 revolution per second. When there is no line-frequency deviation, the rotor field remains locked-in with the now stationary field produced by coils 26A–26C.

To provide a visual indication of the existing time-error, the rotor may be connected through a suitable speed-reducing mechanism exemplified by gear train 31 to the pointer 32 movable relative to the calibrated scale 33. By way of example, the scale range in terms of system time-error may be from −1 second to +1 second: other ranges also presently supplied include the range from −10 seconds to +10 seconds. For recording variations in time-error, the rotor of motor 13 may similarly be connected to a marker 34 movable with respect to a time chart 35 driven by a clock or motor; also and as indicated, the rotor may be connected to position the movable element of a repeater slidewire 36, or equivalent device, for injecting a signal representative of time-error into a computing system which may be used for control of generation in manner such as disclosed, for example in U.S. Letters Patent No. 2,688,728.

The time-error measuring arrangement shown in FIG. 2 is generally similar to that of FIG. 1 and the corresponding elements have ben identified by similar reference characters. The foregoing discussion of FIG. 1 is therefore applicable to FIG. 2 and the following description of FIG. 2 is confined to particulars in which the arrangements differ. In FIG. 2, a three-phase source L3 of line-frequency is available so that it is unnecessary to provide a phase-splitter 10 as in FIG. 1; instead, there is provided a network 10A comprising Y-connected impedances A18, B18, C18 which may be resistors. The leg terminals 19A, 19B, 19C and the neutral terminal 20 have the same connections to the difference-frequency generator 12 as in FIG. 1, but in FIG. 2 the leg terminals are also respectively connected to the conductors of the three-phase line L3. The motor 13 of FIG. 2 may be of the same type as shown in FIG. 1, or alternatively, the fixed magnetic polarization of its rotor may be obtained by using a permanent magnet for at least part of the rotor structure, instead of providing a winding energized from a D.C. source.

The time-error measuring arrangement shown in FIG. 3 is generally similar to that of FIG. 2 so that except in respects below discussed the description of FIG. 2 is also applicable to FIG. 3. In FIG. 3, the three-phase line L3 has a transformer 10B providing a grounded neutral which serves as the neutral point 20 of phase-splitter 10 of FIG. 1 and of the Y network 10A of FIG. 2. Again, the motor 13 has a magnetically polarized rotor whose polarization may be produced either by direct-current excitation of a winding 28 or by use of permanent magnet structure. It is also to be noted that in FIG. 3 the windings 26A, 26B, 26C of motor 13 are shown with a delta connection rather than with a Y connection as in FIGS. 1 and 2: either connection gives the same results in all arrangements shown.

For convenience of explanation, it has been assumed in the description of FIGS. 1 to 3 that the stator element of motor 13 is provided with the three-phase windings 26A–26C and with the rotor element as either a single-phase winding or else includes permanent magnet structure providing at least one pair of poles. It is to be noted, however, that the same operation results if these relations are interchanged; i.e., the rotor may be provided with windings 26A–26C to provide a difference-frequency field rotating with respect to the rotor in a direction and at a speed dependent upon the sense and extent of line-frequency deviation and that the stator may be magnetically polarized either by a direct-current excited winding or by permanent magnet structure.

It is also to be noted that in any of the arrangements of FIGS. 1 to 3 the positions of the sources of line and reference-frequencies may be interchanged without affecting its performance. It is only necessary in the arrangements shown that one of the frequency sources be a three-phase source and that the other be a single-phase source. It is also to be noted that one of these sources is a three-phase source because the motor 13 requires three phases for excitation of its windings 26A–26C: it will be understood that for a polyphase motor other than one of the three-phase type, one of the two frequency sources should provide a corresponding number of phases for motor excitation and that the difference-frequency generator should be correspondingly modified to provide the requisite number of phases at the difference-frequency.

Other modifications can be made within the scope of the appended claims, for example the Y-connected resistors 21A, 21B, 21C may be omitted and the connection from the transformer 25 be made to the common connection of the Y-connected windings 26A, 26B, 26C.

What is claimed is:

1. An arrangement for measuring the time-error of a power-line source subject to line-frequency variations comprising a motor having rotor and stator elements, one of which is provided with a three-phase winding, means connected to said source and producing a three-phase output of line-frequency with respect to a common neutral line, a single-phase source of reference-frequency signals representative of the desired average of said line-frequency and connected to superimpose said reference-frequency signals to be of like phase on said common neutral line, and rectifier means in each of the three-phase outputs for combining said reference-frequency signals and said three-phase output of line-frequency and applying the resultant three-phase difference-frequency signals to said three-phase winding for production by said one element of the motor of a relatively rotating magnetic field, the other of said motor elements being magnetically polarized to lock-in with said rotating magnetic field to effect rotation of said rotor element in a direction dependent upon whether the line-frequency is above or below the reference-frequency and at a speed proportional to the differences between the line and reference frequencies.

2. An arrangement for measuring the time-error of a three-phase line subject to frequency-variations comprising two Y networks having a source of reference-frequency representative of the desired average of the line-frequency connected between their neutral points, and rectifier means connecting their corresponding leg terminals, one of said networks having its leg terminals respectively connected to the three-phase conductors of said three-phase line, and a motor having rotor and stator elements, one of which is magnetically polarized and the other of which has a three-phase winding connected to the leg terminals of the other of said Y networks, the rotor of said motor turning in a direction corresponding with the sense of and at a speed proportional to the deviation of line-frequency from the reference-frequency.

3. An arrangement for measuring the time-error of a single-phase line source subject to frequency-variation comprising a motor having rotor and stator elements, one of which is provided with a three-phase winding, phase-splitting means, connected to said source and producing a three-phase output of line-frequency, a source of reference-frequency signals representative of the desired average of said line-frequency and connected in the neutral of said phase-splitting means, and rectifier means in each of the three-phase outputs of said phase-splitting means for combining said reference-frequency signals and said three-phase output of line-frequency and applying the resultant three-phase difference-frequency signals to said three-phase winding for production by said one element of the motor of a relatively rotating magnetic field, the other of said motor elements being magnetically polarized to lock-in with said rotating magnetic field to effect rotation of said rotor element in a direction dependent upon whether the line-frequency is above or below the reference-frequency and at a speed proportional to the difference between the line and reference frequencies.

4. An arrangement for measuring the time-error of a single-phase line subject to frequency-variations comprising two Y networks having a source of reference-frequency representative of the desired average of the line-frequency connected between their neutral points and rectifier means connecting their corresponding leg terminals, one of said networks comprising the secondary windings of three transformers whose primaries are delta-connected with one terminal of the delta connected to one conductor of said line and the other terminals of the delta connected to the other conductor of said line through inductive and capacitive impedances respectively, and a motor having rotor and stator elements, one of which is magnetically polarized and the other of which has a three-phase winding connected to the leg terminals of the other of said Y networks, the rotor of said motor turning in a direction corresponding with the sense of and at a speed proportional to the deviation of line-frequency from the reference-frequency.

References Cited by the Examiner
UNITED STATES PATENTS

| 1,818,787 | 8/1931 | Bowman et al. | 324—79 |
| 2,650,335 | 8/1953 | Leyton | 321—4 |

WALTER L. CARLSON, *Primary Examiner.*